United States Patent
Ito et al.

(10) Patent No.: US 10,215,645 B2
(45) Date of Patent: Feb. 26, 2019

(54) THERMOMETER

(71) Applicant: FURUYA METAL CO., LTD., Tokyo (JP)

(72) Inventors: Atsushi Ito, Tokyo (JP); Yasuhiro Sato, Tokyo (JP); Tomoaki Miyazawa, Tokyo (JP); Tomohiro Maruko, Tokyo (JP)

(73) Assignee: FURUYA METAL CO., LTD., Tokyo (JP)

( * ) Notice: Subject to any disclaimer, the term of this patent is extended or adjusted under 35 U.S.C. 154(b) by 169 days.

(21) Appl. No.: 14/910,132

(22) PCT Filed: Aug. 7, 2014

(86) PCT No.: PCT/JP2014/070943
§ 371 (c)(1),
(2) Date: Feb. 4, 2016

(87) PCT Pub. No.: WO2015/020172
PCT Pub. Date: Feb. 12, 2015

(65) Prior Publication Data
US 2016/0178447 A1      Jun. 23, 2016

(30) Foreign Application Priority Data
Aug. 8, 2013 (JP) ................. 2013-165040

(51) Int. Cl.
*G01K 7/00* (2006.01)
*G01K 1/00* (2006.01)
(Continued)

(52) U.S. Cl.
CPC ................. *G01K 7/02* (2013.01); *G01K 1/08* (2013.01); *G01K 1/10* (2013.01)

(58) Field of Classification Search
USPC ................................................. 374/179, 208
See application file for complete search history.

(56) References Cited

U.S. PATENT DOCUMENTS

| 4,724,428 A | 2/1988 | Brown, Jr. |
| 4,776,705 A | 10/1988 | Najjar et al. |

(Continued)

FOREIGN PATENT DOCUMENTS

| DE | 2844417 A1 | 3/1980 |
| DE | 10106475 C1 | 9/2002 |

(Continued)

OTHER PUBLICATIONS

Notification of Transmittal of International Preliminary Report on Patentability and Translation of Written Opinion of the International Searching Authority; PCT/JP2014/070943, dated Feb. 18, 2016.
(Continued)

*Primary Examiner* — Mirellys Jagan
(74) *Attorney, Agent, or Firm* — Studebaker & Brackett PC

(57) ABSTRACT

A carbon atmosphere thermometer 10a has: a thermocouple having thermocouple wires 16, 18, a thermocouple temperature measuring junction 14, and an insulating tube 12; a first protection tube 20 surrounding the thermocouple, while at least partially spaced apart from the thermocouple wires 16, 18 and others of the thermocouple; and a second protection tube 22 surrounding the first protection tube 20, while at least partially spaced apart from the first protection tube 20. For this reason, it becomes feasible to protect the thermocouple from the external environment, while preventing the thermocouple from reacting with the first protection tube 20. Furthermore, it becomes feasible to protect the thermocouple and the first protection tube 20 from the external environment, while preventing the first protection tube 20 from reacting with the second protection tube 22.

6 Claims, 6 Drawing Sheets

(51) Int. Cl.
*G01K 7/02* (2006.01)
*G01K 1/10* (2006.01)
*G01K 1/08* (2006.01)

(56) References Cited

U.S. PATENT DOCUMENTS

| | | | | |
|---|---|---|---|---|
| 4,984,904 | A | * | 1/1991 | Nakano .................... G01K 1/08 136/232 |
| 5,181,779 | A | * | 1/1993 | Shia ........................ G01K 1/105 136/232 |
| 5,520,461 | A | | 5/1996 | Curry et al. |
| 6,050,723 | A | * | 4/2000 | Amra ..................... G01K 1/105 374/139 |
| 2001/0033599 | A1 | * | 10/2001 | Isshiki ................... G01K 1/125 374/179 |
| 2009/0141772 | A1 | * | 6/2009 | Robinson ............... G01K 7/023 374/179 |

FOREIGN PATENT DOCUMENTS

| | | |
|---|---|---|
| EP | 0454846 A1 | 11/1991 |
| GB | 2193376 A | 2/1988 |
| JP | S54-34876 A | 3/1979 |
| JP | S57-101730 A | 6/1982 |
| JP | S62-102133 U | 6/1987 |
| JP | S63-187018 U | 11/1988 |
| JP | S63-300924 A | 12/1988 |
| JP | H07501144 A | 2/1995 |
| JP | 2000-055740 A | 2/2000 |

OTHER PUBLICATIONS

The extended European search report issued by the European Patent Office dated Feb. 10, 2017, which corresponds to European Patent Application No. 14833914.6-1555 and is related to U.S. Appl. No. 14/910,132.

International Searching Report; PCT/JP2014/070943, dated Nov. 11, 2014.

Extended European Search Report issued by the European Patent Office dated Nov. 30, 2017, which corresponds EP17189349.8-1555 and is related to U.S. Appl. No. 14/910,132.

An Office Action; "Notification of Reasons for Refusal," mailed by the Japanese Patent Office dated May 22, 2018, which corresponds to Japanese Patent Application No. 2015-530965 and is related to U.S. Appl. No. 14/910,132; with English language translation.

A Notice of Allowance issued by the United States Patent and Trademark Office dated Nov. 5, 2018, which corresponds to U.S. Appl. No. 15/870,512 and is related to U.S. Appl. No. 14/910,132.

* cited by examiner

THERMOMETER

TECHNICAL FIELD

The present invention relates to a thermometer and, particularly, to a thermometer having a thermocouple and protection tubes.

BACKGROUND ART

In transportation-related sections and aerospace fields, active development of carbon-based materials has been conducted in recent years, for the purposes of energy saving based on weight reduction and $CO_2$ emission control. Furthermore, SiC, which is a compound of carbon and silicon, is also acknowledged as an engineering ceramic and power semiconductor with very high characteristics and is already developed to a practical level. The advantages of the carbon-based materials include light weight, high strength, high specific strength, good heat conductivity, and, high heat resistance because of the high melting point of carbon itself.

Such materials are generally manufactured in a high temperature range over 1800° C. On this occasion, stable manufacture at high yields becomes possible with execution of temperature control during manufacture and thus it is an urgent necessity to develop a temperature measuring method in the high temperature range. A conventional temperature measuring method is a method using a radiation thermometer. However, temperature measurement is impossible in situations where an obstacle lies between the radiation thermometer and a temperature measurement target. In addition, it has other problem that temperature measurement accuracy considerably worsens in situations where infrared rays radiated from the temperature measurement target are absorbed by gas or the like.

As a solution to the foregoing problems of the radiation thermometer, there is a method making use of a thermometer using a thermocouple. Temperature measurement by the thermocouple is a method of combining wires of dissimilar materials to measure a thermoelectromotive force generated by a temperature difference in a circuit. In the temperature measurement by the thermocouple, the thermocouple can be installed in the vicinity of the temperature measurement target because the thermocouple consists of the wires, and thus it can measure temperatures with accuracy.

A tungsten-rhenium (WRe) thermocouple is known as a thermocouple for high-temperature measurement and can measure ultra-high temperatures around 3000° C. in vacuum, reductive, and inert atmospheres. An iridium-iridium rhodium (Ir-IrRh) thermocouple can measure temperatures up to around 2200° C. even in an oxidative atmosphere if the measurement is performed in short time, as well as in the vacuum, reductive, and inert atmospheres. However, under circumstances where the thermocouple is exposed to a carbon-existing atmosphere at high temperatures or under circumstances where the thermocouple touches carbon at high temperatures, the wires of the thermocouple react with carbon to change the thermoelectromotive force and, for this reason, it is difficult to use the thermocouple without protection for the wires.

It is thus common practice to provide a protection tube surrounding the thermocouple, to protect the thermocouple. For example, Patent Document 1 discloses the protection tube surrounding the thermocouple, which is the protection tube having a double-layered structure wherein portions constituting an inner peripheral wall and an outer peripheral wall of the protection tube have different compositions. In the protection tube of Patent Document 1, the inner peripheral wall of the protection tube is comprised of a material such as silicon nitride ($Si_3N_4$) with excellent heat resistance and high thermal conductivity. The outer peripheral wall of the protection tube is comprised of a ceramic material such as mixture of magnesia (MgO) particles and carbon (C) particles poorly reactive with temperature measurement objects. The inner peripheral wall and outer peripheral wall of the protection tube are comprised of respective sintered bodies, which are obtained by such integral firing as to adhere the inside sintered body and the outside sintered body to each other.

PRIOR ART DOCUMENTS

Patent Document
    Patent Document 1: Japanese Unexamined Patent Publication No. 2000-55740

SUMMARY OF INVENTION

Problems to be Resolved by the Invention

In the case of the protection tube of the multilayer structure as disclosed in Patent Document 1, however, reaction occurs between the material of the outer peripheral wall and the material of the inner peripheral wall, particularly, in the high temperature range, and it is thus difficult to protect the wires of the thermocouple over a long period of time.

The present invention has been accomplished in view of the above problem and it is an object of the present invention to provide a thermometer capable of protecting the thermocouple from the external environment, while preventing the layers of the protection tube from reacting with each other.

Means of Solving the Problems

One embodiment of the present invention is a thermometer comprising: a thermocouple having a pair of wires, a temperature measuring junction between the wires, and an insulator covering the wires; a first protection tube surrounding the wires, the temperature measuring junction, and the insulator of the thermocouple, while at least partially spaced apart from the wires, the temperature measuring junction, and the insulator of the thermocouple; and a second protection tube surrounding the first protection tube, while at least partially spaced apart from the first protection tube.

In this configuration, the thermometer comprises: the thermocouple having the pair of wires, the temperature measuring junction between the wires, and the insulator covering the wires; the first protection tube surrounding the wires, the temperature measuring junction, and the insulator of the thermocouple, while at least partially spaced apart from the wires, the temperature measuring junction, and the insulator of the thermocouple; and the second protection tube surrounding the first protection tube, while at least partially spaced apart from the first protection tube. The first protection tube surrounds the wires, the temperature measuring junction, and the insulator of the thermocouple, while at least partially spaced apart from the wires, the temperature measuring junction, and the insulator of the thermocouple. For this reason, while preventing the thermocouple from reacting with the first protection tube, the thermocouple can be protected from the external environment. Furthermore, the second protection tube surrounds the first protection tube, while at least partially spaced apart from the first protection tube. For this reason, while preventing the first protection tube from reacting with the second protection tube, the thermocouple and the first protection tube can be protected from the external environment.

In this case, at least either of an interior of the first protection tube or a space between the first protection tube and the second protection tube may be filled with an inert gas.

In this configuration, at least either of the interior of the first protection tube or the space between the first protection tube and the second protection tube is filled with the inert gas. For example, when the interior of the first protection tube is filled with the inert gas, an interior of an insulating tube as the insulator covering the wires, i.e., an atmosphere around the wires is also the inert gas. Even in a case where a hollow member with an open or closed end face is disposed around the temperature measuring junction, the atmosphere around the temperature measuring junction and the wires is the inert gas. For this reason, it is feasible to effectively prevent reaction between the thermocouple and the first protection tube or reaction between the first protection tube and the second protection tube.

Furthermore, the thermometer may further comprise third protection tube located outside the first protection tube and inside the second protection tube and surrounding the first protection tube, while at least partially spaced apart from the first protection tube and the second protection tube.

In this configuration, the thermometer further comprises the third protection tube located outside the first protection tube and inside the second protection tube and surrounding the first protection tube, while at least partially spaced apart from the first protection tube and the second protection tube. For this reason, it is feasible to effectively prevent the first protection tube from reacting with the second protection tube, while preventing the first protection tube and the second protection tube from reacting with the third protection tube.

In this case, at least any one of an interior of the first protection tube, a space between the first protection tube and the third protection tube, and a space between the second protection tube and the third protection tube may be filled with an inert gas.

In this configuration, at least any one of the interior of the first protection tube, the space between the first protection tube and the third protection tube, and the space between the second protection tube and the third protection tube is filled with the inert gas. As described above, for example, when the interior of the first protection tube is filled with the inert gas, the interior of the insulating tube as the insulator covering the wires, i.e., the atmosphere around the wires is also the inert gas. Even in the case where a hollow member with an open or closed end face is disposed around the temperature measuring junction, the atmosphere around the temperature measuring junction and the wires is the inert gas. For this reason, it is feasible to effectively prevent reaction between the thermocouple and the first protection tube, reaction between the first protection tube and the third protection tube, and reaction between the second protection tube and the third protection tube.

In the thermometer comprising the first protection tube and the second protection tube, the first protection tube may contain any one of Mo, W, Ta, and Ir and the second protection tube may contain any one of graphite, C/C composite, glassy carbon, SIC, and BN.

In this configuration, since the first protection tube contains any one of Mo, W, Ta, and Ir having low reactivity with the thermocouple and the second protection tube, the lifetime of the thermocouple can be improved while the thermocouple is certainly protected from the external environment. Since the second protection tube contains any one of graphite, C/C composite, glassy carbon, SiC, and BN having low reactivity with carbon in an atmosphere and the first protection tube, the thermocouple and the first protection tube can be certainly protected from the external environment.

In the thermometer comprising the first protection tube and the second protection tube, the first protection tube may contain any one of Mo, W, Ta, and Ir and the second protection tube may contain any one of graphite, C/C composite, glassy carbon, SiC, BN, $Al_2O_3$, vitreous carbon, pyrolytic carbon-coated graphite, vitreous carbon-coated graphite, and PBN (pyrolytic boron nitride).

In this configuration, since the first protection tube contains any one of Mo, W, Ta, and Ir having low reactivity with the thermocouple and the second protection tube, the lifetime of the thermocouple can be improved while the thermocouple is certainly protected from the external environment. Since the second protection tube contains any one of the foregoing graphite, C/C composite, glassy carbon, SiC, and BN, or, contains any one of $Al_2O_3$, vitreous carbon, pyrolytic carbon-coated graphite, vitreous carbon-coated graphite, and PBN having the same effect as the foregoing materials, the thermocouple and the first protection tube can be certainly protected from the external environment.

In the thermometer comprising the first protection tube, the second protection tube, and the third protection tube, the first protection tube may contain any one of Mo, W, Ta, and Ir, the second protection tube may contain any one of graphite, C/C composite, glassy carbon, SiC, and BN, and the third protection tube may contain any one of Mo, W, Ta, Nb, and Ir.

In this configuration, since the first protection tube contains any one of Mo, W, Ta, and Ir having low reactivity with the thermocouple and the third protection tube, the lifetime of the thermocouple can be improved. Since the second protection tube contains any one of graphite, C/C composite, glassy carbon, SiC, and BN having low reactivity with carbon in an atmosphere and the third protection tube, the thermocouple, the first protection tube, and the third protection tube can be certainly protected from the external environment. Furthermore, since the third protection tube contains any one of Mo, W, Ta, Nb, and Ir having low reactivity with the first protection tube and the second protection tube, the thermocouple and the first protection tube can be certainly protected from the external environment.

In the thermometer comprising the first protection tube, the second protection tube, and the third protection tube, the first protection tube may contain any one of Mo, W, Ta, and Ir, the second protection tube may contain any one of graphite, C/C composite, glassy carbon, SiC, BN, $Al_2O_3$, vitreous carbon, pyrolytic carbon-coated graphite, vitreous carbon-coated graphite, and PBN, and the third protection tube may contain any one of Mo, W, Ta, Nb, Ir, graphite, C/C composite, SiC, glassy carbon, vitreous carbon, pyrolytic carbon-coated graphite, vitreous carbon-coated graphite, BN, and PBN.

In this configuration, since the first protection tube contains any one of Mo, W, Ta, and Ir having low reactivity with the thermocouple and the third protection tube, the lifetime of the thermocouple can be improved. Since the second protection tube contains any one of the foregoing graphite, C/C composite, glassy carbon, SiC, and BN, or, contains any one of $Al_2O_3$, vitreous carbon, pyrolytic carbon-coated graphite, vitreous carbon-coated graphite, and PBN having the same effect as the foregoing materials, the thermocouple, the first protection tube, and the third protection tube can be certainly protected from the external environment. Furthermore, since the third protection tube contains any one of Mo, W, Ta, Nb, and Ir, or, contains any one of graphite, C/C composite, SiC, glassy carbon, vitreous carbon, pyrolytic carbon-coated graphite, vitreous carbon-coated graphite, BN, and PBN having the same effect as the foregoing materials, the thermocouple and the first protection tube can be certainly protected from the external environment.

In the thermometer comprising the first protection tube, the second protection tube, and the third protection tube, the first protection tube may contain any one of $Al_2O_3$, MgO, CaO, BeO, $ZrO_2$, and $HfO_2$, the second protection tube may contain any one of graphite, C/C composite, glassy carbon, SiC, and BN, and the third protection tube may contain any one of Mo, W, Ta, Nb, and Ir.

In this configuration, since the first protection tube contains any one of $Al_2O_3$, MgO, CaO, BeO, $ZrO_2$, and $HfO_2$ which are stable oxides having low reactivity with the thermocouple and the third protection tube, the lifetime of the thermocouple can be improved. Since the second protection tube contains any one of graphite, C/C composite, glassy carbon, SiC, and BN having low reactivity with carbon in an atmosphere and the third protection tube, the thermocouple, the first protection tube, and the third protection tube can be certainly protected from the external environment. Furthermore, since the third protection tube contains any one of Mo, W, Ta, Nb, and Ir having low reactivity with the first protection tube and the second protection tube, the thermocouple and the first protection tube can be certainly protected from the external environment.

In the thermometer comprising the first protection tube, the second protection tube, and the third protection tube, the first protection tube may contain any one of $Al_2O_3$, MgO, CaO, BeO, $ZrO_2$, and $HfO_2$, the second protection tube may contain any one of graphite, C/C composite, glassy carbon, SiC, BN, $Al_2O_3$, vitreous carbon, pyrolytic carbon-coated graphite, vitreous carbon-coated graphite, and PBN, and the third protection tube may contain any one of Mo, W, Ta, Nb, Ir, graphite, C/C composite, SiC, glassy carbon, vitreous carbon, pyrolytic carbon-coated graphite, vitreous carbon-coated graphite, BN, and PBN In this configuration, since the first protection tube contains any one of $Al_2O_3$, MgO, CaO, BeO, $ZrO_2$, and $HfO_2$ which are stable oxides having low reactivity with the thermocouple and the third protection tube, the lifetime of the thermocouple can be improved. Since the second protection tube contains any one of the foregoing graphite, C/C composite, glassy carbon, SiC, and BN, or, contains any one of $Al_2O_3$, vitreous carbon, pyrolytic carbon-coated graphite, vitreous carbon-coated graphite, and PBN having the same effect as the foregoing materials, the thermocouple, the first protection tube, and the third protection tube can be certainly protected from the external environment. Furthermore, since the third protection tube contains any one of Mo, W, Ta, Nb, and Ir, or, contains any one of graphite, C/C composite, SiC, glassy carbon, vitreous carbon, pyrolytic carbon-coated graphite, vitreous carbon-coated graphite, BN, and PBN having the same effect as the foregoing materials, the thermocouple and the first protection tube can be certainly protected from the external environment.

Advantageous Effects of Invention

The thermometer according to the one embodiment of the present invention has enabled the thermocouple to be protected from the external environment, while preventing the protection tubes from reacting with each other.

DESCRIPTION OF SPECIFIC EMBODIMENTS

Embodiments of the present invention will be described below in detail with reference to the accompanying drawings. The thermometer of the first embodiment of the present invention is a thermometer using a thermocouple capable of measuring temperatures under a carbon-existing atmosphere, particularly, at high temperatures over 1700° C. Multiple protection tubes are used to protect the thermocouple from the external carbon atmosphere and to prevent adverse effects on an interior of a furnace and products.

Figure 1:
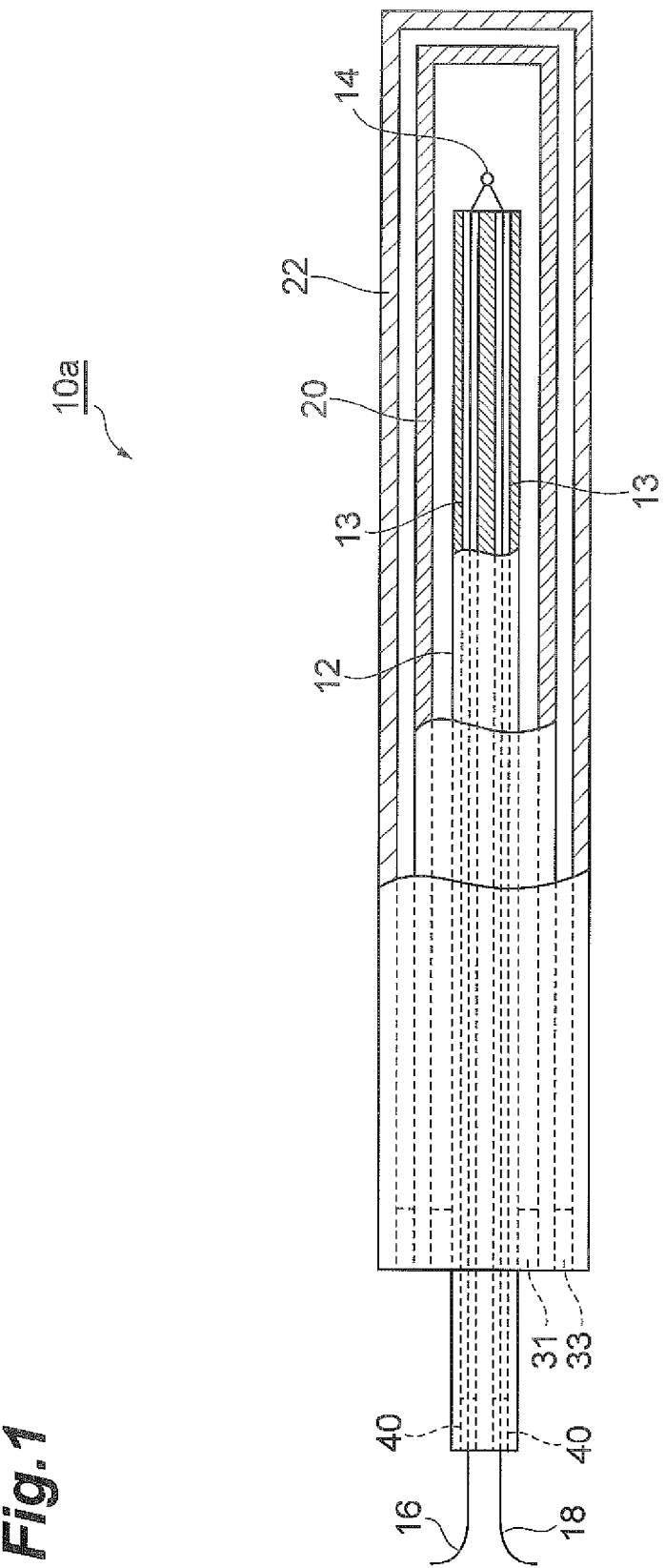
FIG. 1 is a partial cross-sectional view showing carbon atmosphere thermometer according to the first embodiment.

As shown in FIG. 1, the carbon atmosphere thermometer 10a of the present embodiment has an insulating tube 12, a thermocouple temperature measuring junction 14, thermocouple wires 16, 18, a first protection tube 20, and a second protection tube 22. The thermocouple is constituted of the pair of thermocouple wires 16, 18, the thermocouple temperature measuring junction 14 between the thermocouple wires 16, 18, and the insulating tube 12 covering the thermocouple wires 16, 18.

Figure 2:
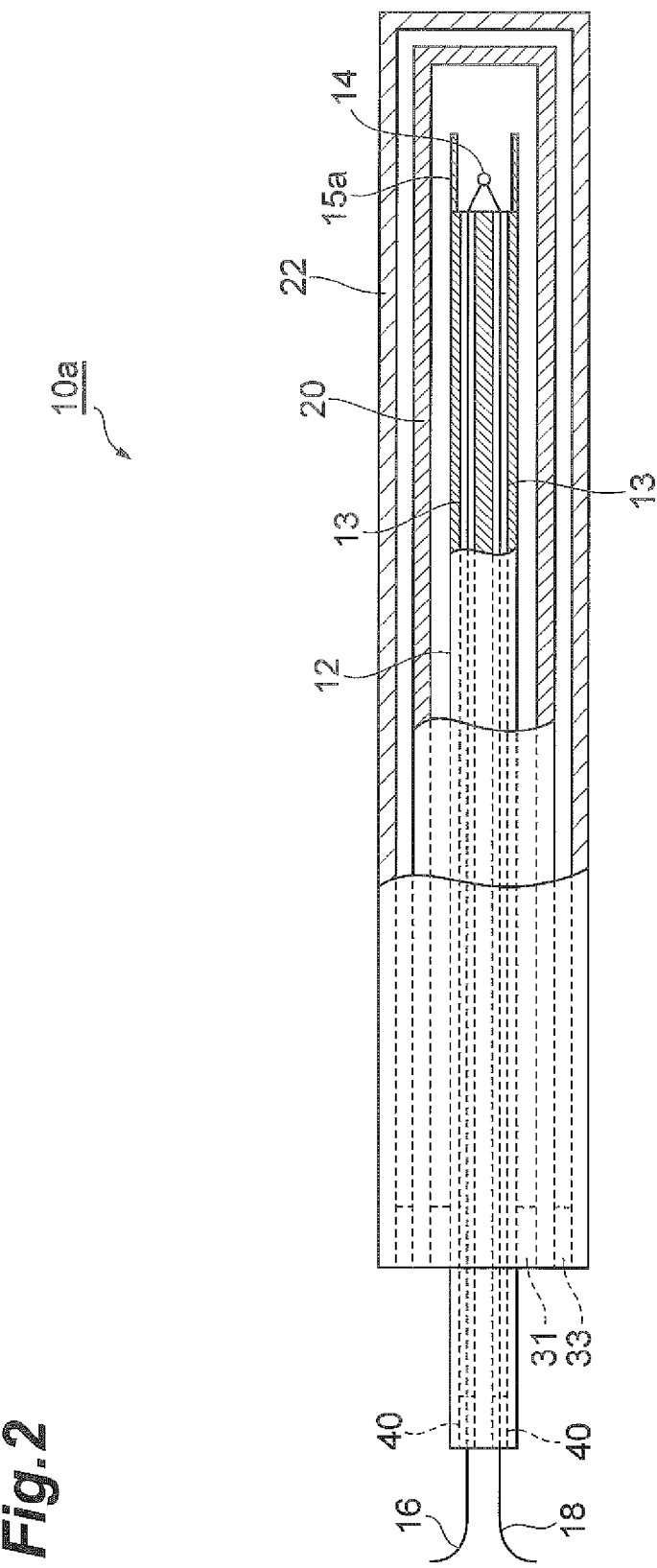
FIG. 2 is a partial cross-sectional view showing a modification example of an insulating tube shown in FIG. 1, in the vicinity of the temperature measuring junction of the thermocouple.
Figure 3:
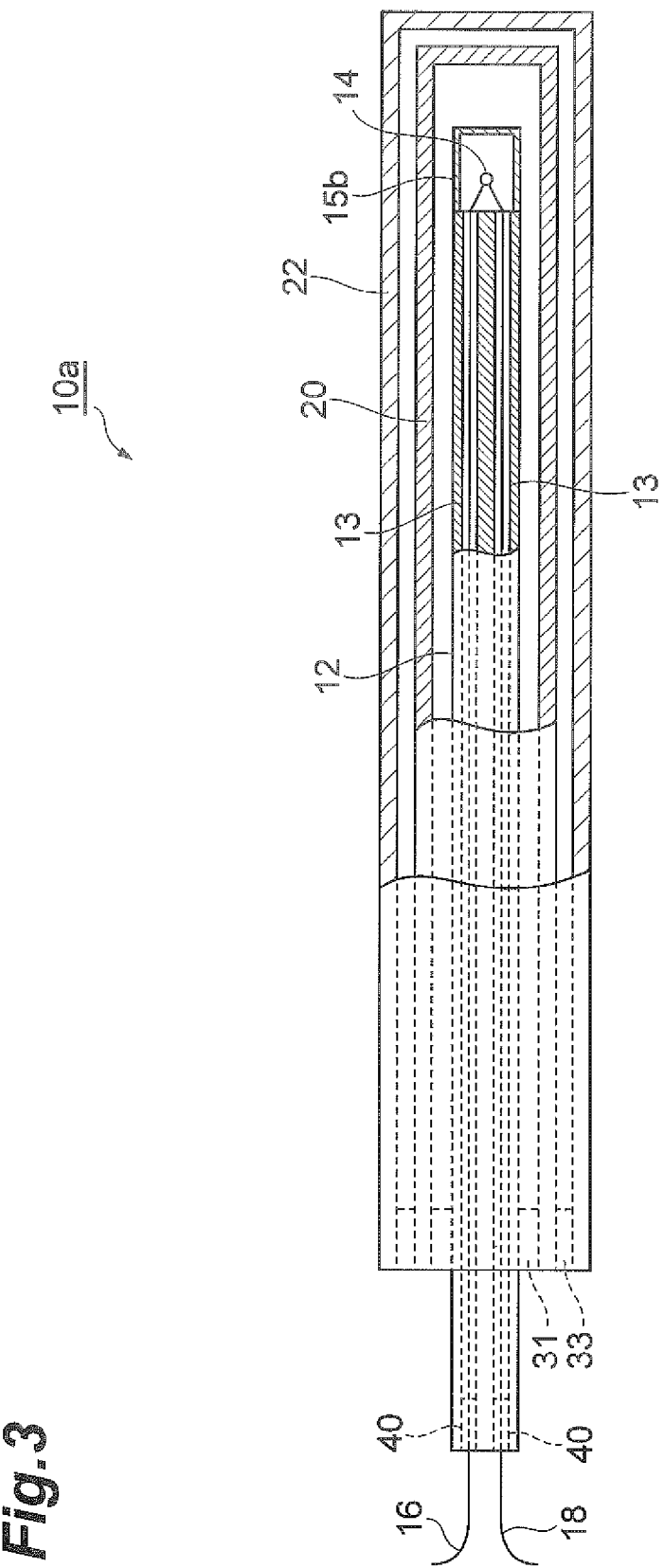
FIG. 3 is a partial cross-sectional view showing a modification example of the insulating tube shown in FIG. 1, in the vicinity of the temperature measuring junction of the thermocouple.

The thermocouple wires 16, 18 can be comprised, for example, of tungsten (W) and W=26% rhenium (Re), W=5% Re and W-26% Re, or, W-3% Re and W=25% Re, respectively. Or, the thermocouple wires 16, 18 can be comprised, for example, of the thermocouple wire 16 of iridium (Ir) and the thermocouple wire 18 of iridium and rhodium (IrRh), respectively. The insulating tube 12 is provided with axially-extending insertion holes 13 in which the thermocouple wires 16, 18 are individually inserted. The insulating tube 12 is made of a material with excellent insulation and heat resistance and, for example, can be comprised of a ceramic such as alumina ($Al_2O_3$), magnesia (MgO), beryllia (BeO), or hafnia ($HfO_2$). The thermocouple temperature measuring junction 14 is exposed from the tip of the insulating tube 12. FIG. 1 shows the configuration wherein the thermocouple temperature measuring junction 14 is not protected by the insulating tube 12, but, as shown in FIG. 2, a hollow insulating tube open tip end 15a with an open end face may be installed so as to surround the surroundings of the thermocouple temperature measuring junction 14. Or, as shown in FIG. 3, a hollow insulating tube closed tip end 15b with a closed end face may be installed so as to surround the surroundings of the thermocouple temperature measuring junction 14. Furthermore, the insertion holes 13 of the insulating tube 12 may be sealed with a sealant 40 at their ends opposite to the thermocouple temperature measuring junction 14.

The first protection tube 20 surrounds the thermocouple wires 16, 18, the thermocouple temperature measuring junction 14, and the insulating tube 12 of the thermocouple, while at least partially spaced apart from the thermocouple wires 16, 18, the thermocouple temperature measuring junction 14, and the insulating tube 12 of the thermocouple with a gap. The first protection tube 20 is comprised of any one of Mo, W, Ta, and Ir having low reactivity with the thermocouple wires 16, 18 and others of the thermocouple located inside and with the second protection tube 22 located outside. One end of the first protection tube 20 is closed. The insulating tube is inserted in the first protection tube 20 so as to keep the thermocouple temperature measuring junction 14 of the thermocouple out of contact with the inner surface of the closed end of the first protection tube 20. The insulating tube 12 of the thermocouple is exposed from the end of the first protection tube 20 opposite to the thermocouple temperature measuring junction 14. The interior of the first protection tube 20 is filled with an inert gas such as Ar. At the end of the first protection tube 20 where the insulating tube 12 is exposed, the gap between the first protection tube 20 and the insulating tube 12 is sealed with a sealant 31.

The second protection tube 22 surrounds the first protection tube 20, while at least partially spaced apart from the first protection tube 20 with a gap. The second protection tube 22 is comprised of any one of graphite, C/C composite, glassy carbon, SiC, and BN having low reactivity with the first protection tube 20 located inside and with the outside carbon atmosphere and having airtightness. Furthermore, the second protection tube 22 is comprised of any one of $Al_2O_3$, vitreous carbon, pyrolytic carbon-coated graphite, vitreous carbon-coated graphite, BN, and PBN having the same effect as the foregoing graphite, C/C composite, glassy carbon, SiC, and BN. Namely, the second protection tube 22 may contain any one of graphite, C/C composite, glassy carbon, SiC, BN, $Al_2O_3$, vitreous carbon, pyrolytic carbon-coated graphite, vitreous carbon-coated graphite, and PBN. The second protection tube 22 is closed at one end on the side where the thermocouple temperature measuring junction 14 lies, but the second protection tube 22 may have an unclosed and open part on the opposite side to the thermocouple temperature measuring junction 14 or the like as long as there is no influence on measurement of temperature and on the first protection tube 20. The first protection tube 20 is inserted in the interior of the second protection tube 22 so as to keep the outer surface of the first protection tube 20 out of contact with the inner surface of the second protection tube 22. The space between the first protection tube 20 and the second protection tube 22 is filled with an inert gas such as Ar. At the ends of the first protection tube 20 and second protection tube 22 opposite to the thermocouple temperature measuring junction 14, the gap between the first protection tube 20 and the second protection tube 22 is sealed with a sealant 33.

According to the present embodiment, the carbon atmosphere thermometer 10a has the thermocouple having the pair of thermocouple wires 16, 18, the thermocouple temperature measuring junction 14 between the thermocouple wires 16, 18, and the insulating tube 12 covering the thermocouple wires 16, 18, the first protection tube 20 surrounding the thermocouple wires 16, 18, the thermocouple temperature measuring junction 14, and the insulating tube 12 of the thermocouple, while at least partially spaced apart from the thermocouple wires 16, 18, the thermocouple temperature measuring junction 14, and the insulating tube 12 of the thermocouple; and the second protection tube 22 surrounding the first protection tube 20, while at least partially spaced apart from the first protection tube 20. The first protection tube 20 surrounds the thermocouple wires 16, 18, the thermocouple temperature measuring junction 14, and the insulating tube 12 of the thermocouple, while at least partially spaced apart from the thermocouple wires 16, 18, the thermocouple temperature measuring junction 14, and the insulating tube 12 of the thermocouple. For this reason, it becomes feasible to protect the thermocouple from the external environment, while preventing the thermocouple from reacting with the first protection tube 20. Furthermore, the second protection tube 22 surrounds the first protection tube 20, while at least partially spaced apart from the first protection tube 20. For this reason, it becomes feasible to protect the thermocouple and the first protection tube 20 from the external environment, while preventing the first protection tube 20 from reacting with the second protection tube 22.

The interior of the first protection tube 20 and the space between the first protection tube 20 and the second protection tube 22 are filled with the inert gas. When the interior of the first protection tube 20 is filled with the inert gas, the interior of the insulating tube 12, i.e., an atmosphere around the thermocouple wires 16, 18 is also the inert gas. Even in the case where the insulating tube open tip end 15 a as the hollow member with the open end face or the insulating tube closed tip end 15b as the hollow member with the closed end face is disposed around the thermocouple temperature measuring junction 14, an atmosphere around the thermocouple temperature measuring junction 14 and the thermocouple wires 16, 18 is the inert gas. For this reason, it is feasible to effectively prevent reaction between the thermocouple and first protection tube 20 and reaction between the first protection tube 20 and the second protection tube 22.

Since the first protection tube 20 contains any one of Mo, W, Ta, and Ir having low reactivity with the thermocouple and the second protection tube 22, the lifetime of the thermocouple can be improved while the thermocouple is certainly protected from the external environment. Since the second protection tube 22 contains any one of graphite, C/C composite, glassy carbon, SiC, and BN having low reactivity with carbon in an atmosphere and the first protection tube 20, or, contains any one of $Al_2O_3$, vitreous carbon, pyrolytic carbon-coated graphite, vitreous carbon-coated graphite, and PBN having the same effect as the foregoing graphite, C/C composite, glassy carbon, SiC, and BN, the thermocouple and the first protection tube 20 can be certainly protected from the external environment.

It is conventionally common practice to use the protection tube of a stable oxide such as $Al_2O_3$ or MgO, particularly, in the high temperature range, for the purpose of protecting the wires of the thermocouple from the external environment. However, the oxide is reduced in the high-temperature carbon atmosphere to deteriorate the protection tube and therefore it is impossible to protect the wires of the thermocouple over a long period of time. Furthermore, the deterioration of the oxide protection tube and exposure of a metal component due to the reduction of the oxide may adversely affect products in a thermal treatment furnace or in a thermal treatment step. In this manner, the conventional technique does not allow stable and accurate temperature measurement to be performed over a long period of time in the carbon-existing atmosphere at ultra-high temperatures. However, the carbon atmosphere thermometer 10a of the present embodiment can provide the thermometer that can stably and accurately measure temperatures over a long period of time in the high-temperature carbon atmosphere where it is difficult for the conventional thermometers to perform measurement, and that prevents the components of the protection tubes from affecting an object to be thermally treated.

Figure 4:
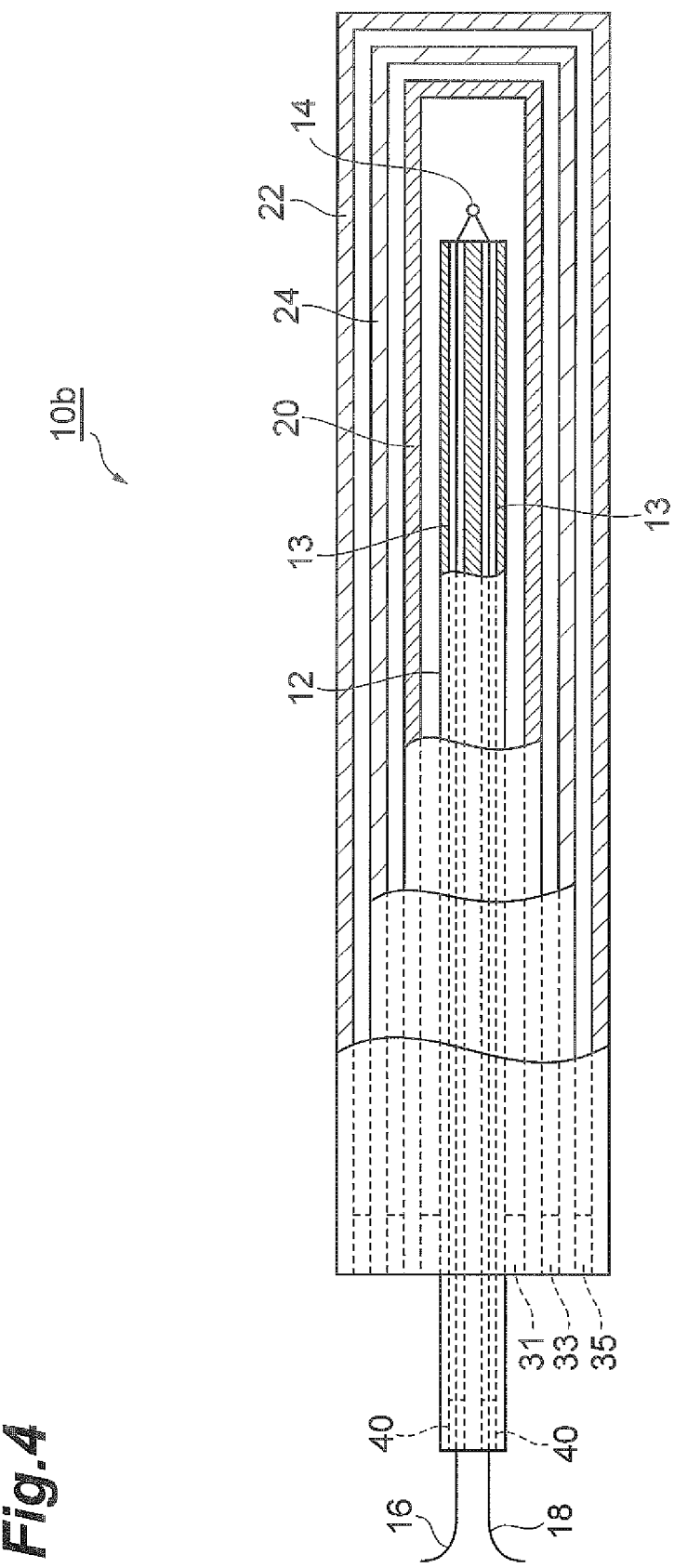
FIG. 4 is a partial cross-sectional view showing a carbon atmosphere thermometer according to the second embodiment.

The second embodiment of the present invention will be described below. As shown in FIG. 4, the carbon atmosphere thermometer 10b of the present embodiment is identical in the configuration of the thermocouple including the thermocouple wires 16, 18 and others, the configuration except for the composition of the first protection tube 20, and the configuration of the second protection tube 22 with the first embodiment, but is different from the first embodiment in that the thermometer 10b further has a third protection tube 24 located outside the first protection tube 20 and inside the second protection tube 22 and surrounding the first protection tube 20, while at least partially spaced apart from the first protection tube 20 and the second protection tube 22. In the present embodiment, the first protection tube 20 is comprised of any one of Mo, W, Ta, and Ir having low reactivity with the thermocouple wires 16, 18 and others of the thermocouple located inside and with the third protection tube located outside. The third protection tube 24 is comprised of any one of Mo, W, Ta, Nb, and Ir having low reactivity with the inside first protection tube 20 and the outside second protection tube 22. Furthermore, the third protection tube 24 is comprised of any one of graphite, C/C composite, SiC, glassy carbon, vitreous carbon, pyrolytic carbon-coated graphite, vitreous carbon-coated graphite, BN, and PBN having the same effect as the foregoing Mo, W, Ta, Nb, and Ir. Namely, the third protection tube 24 may contain any one of Mo, W, Ta, Nb, Ir, graphite, C/C composite, SIC, glassy carbon, vitreous carbon, pyrolytic carbon-coated graphite, vitreous carbon-coated graphite, BN, and PBN.

Or, in the present embodiment, the first protection tube 20 may be comprised of any one of $Al_2O_3$, MgO, CaO, BeO, $ZrO_2$, and $HfO_2$ which are stable oxides having low reactivity with the inside thermocouple wires 16, 18 and others of the thermocouple and with the outside third protection tube 24. In this case, the third protection tube 24 is comprised of any one of Mo, W, Ta, Nb, and Ir having low reactivity with the inside first protection tube 20 and the outside second protection tube 22. Furthermore, the third protection tube 24 is comprised of any one of graphite, C/C composite, SiC, glassy carbon, vitreous carbon, pyrolytic carbon-coated graphite, vitreous carbon-coated graphite, BN, and PBN having the same effect as the foregoing Mo, W, Ta, Nb, and Ir. Namely, the third protection tube 24 may contain any one of Mo, W, Ta, Nb, Ir, graphite, C/C composite, SiC, glassy carbon, vitreous carbon, pyrolytic carbon-coated graphite, vitreous carbon-coated graphite, BN, and PBN. The third protection tube 24 is closed at one end on the side where the thermocouple temperature measuring junction 14 lies, but if the second protection tube 22 is closed, the one end off the third protection tube 24 may be unclosed and open. Furthermore, at least one end of the third protection tube 24 and the second protection tube 22 opposite to the thermocouple temperature measuring junction 14 may have an unclosed and open part. Namely, at least one end of the third protection tube 24 and the second protection tube 22 opposite to the thermocouple temperature measuring junction 14 may be open as long as there is no influence on the measurement of temperature and the first protection tube 20.

Figure 5:
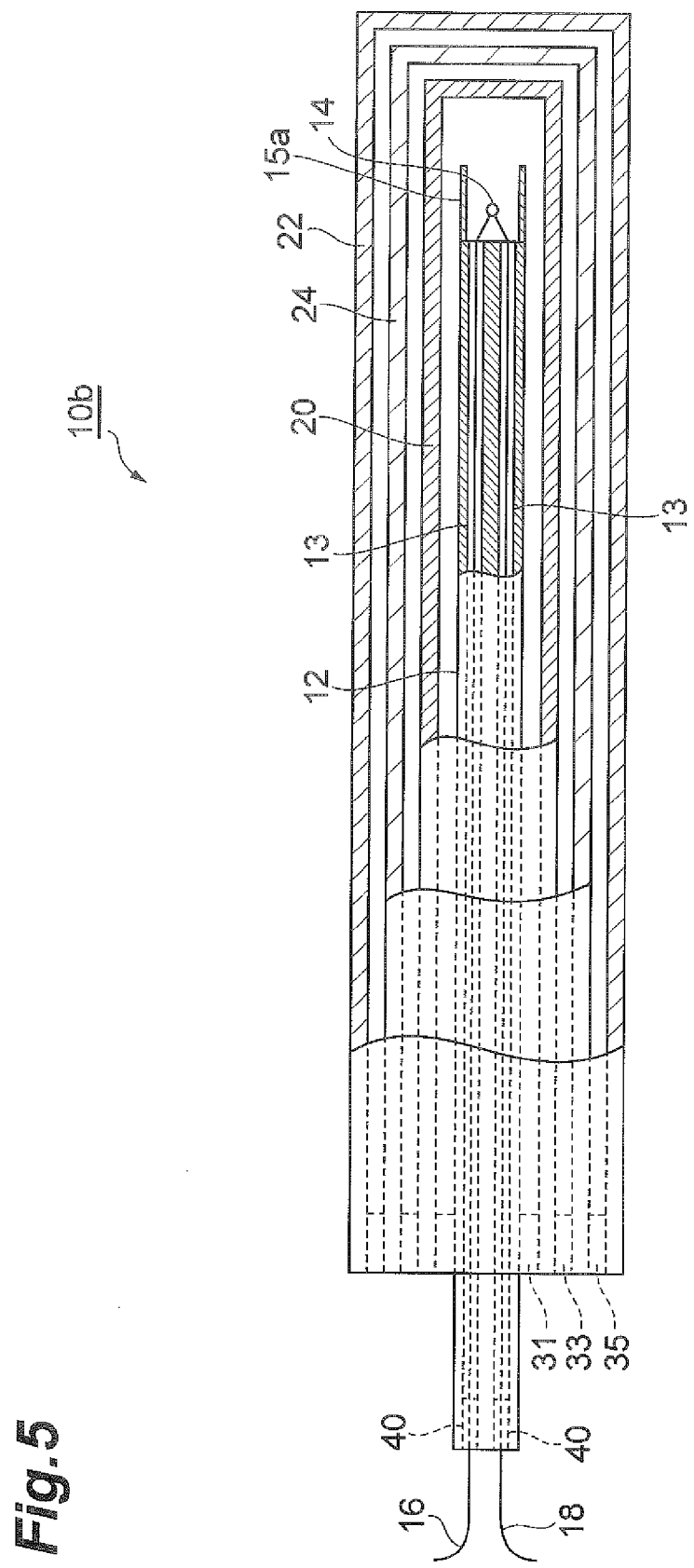
FIG. 5 is a partial cross-sectional view showing a modification example of the insulating tube shown in FIG. 4, in the vicinity of the temperature measuring junction of the thermocouple.
Figure 6:
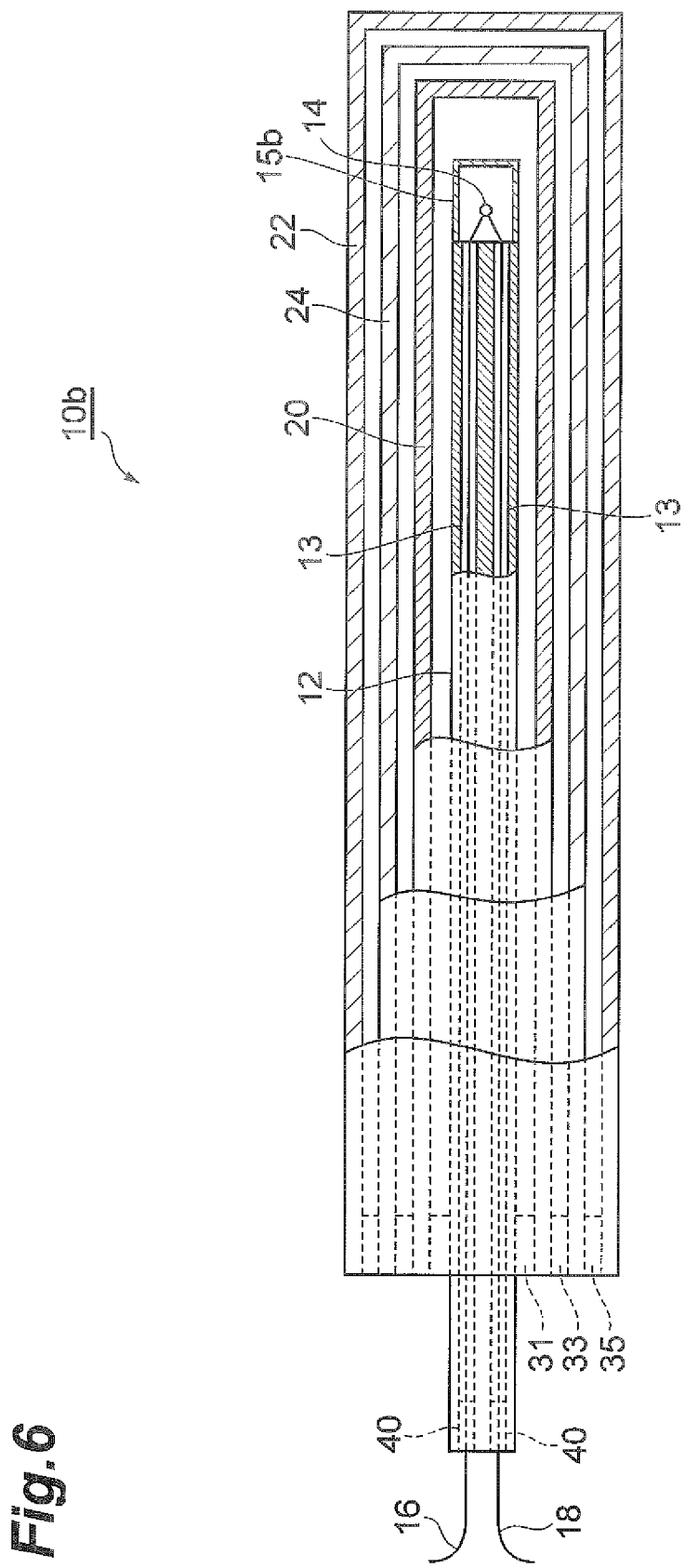
FIG. 6 is a partial cross-sectional view showing a modification example of the insulating tube shown in FIG. 4, in the vicinity of the temperature measuring junction of the thermocouple.

The space between the first protection tube 20 and the third protection tube 24 and the space between the second protection tube 22 and the third protection tube 24 are filled with an inert gas such as Ar. At the ends of the first protection tube 20 and the third protection tube 24 opposite to the thermocouple temperature measuring junction 14, the gap between the first protection tube 20 and the third protection tube 24 is sealed with the sealant 33. At the ends of the second protection tube 22 and the third protection tube 24 opposite to the thermocouple temperature measuring junction 14, the gap between the second protection tube 22 and the third protection tube 24 is sealed with a sealant 35. As in the first embodiment, the interior of the first protection tube 20 is filled with the inert gas such as Ar. At the end of the first protection tube 20 where the insulating tube 12 projects out, the gap between the first protection tube 20 and the insulating tube 12 is filled with the sealant 31. FIG. 4 shows the configuration wherein the thermocouple temperature measuring junction 14 is not protected by the insulating tube 12, but, as shown in FIG. 5, the hollow insulating tube open tip end 15a with the open end face may be installed so as to surround the surroundings of the thermocouple temperature measuring junction 14. Or, as shown in FIG. 6, the hollow insulating tube closed tip end 15b with the closed end face may be installed so as to surround the surroundings of the thermocouple temperature measuring junction 14. Furthermore, the insertion holes 13 of the insulating tube 12 at their ends opposite to the thermocouple temperature measuring junction 14 are sealed with the sealant 40.

In the present embodiment, the thermometer further has the third protection tube 24 located outside the first protection tube 20 and inside the second protection tube 22 and surrounding the first protection tube 20, while at least partially spaced apart from the first protection tube 20 and the second protection tube 22. For this reason, while the first protection tube 20 and second protection tube 22 are prevented from reacting with the third protection tube 24, the first protection tube 20 can be effectively prevented from reacting with the second protection tube 22.

In the present embodiment, the interior of the first protection tube 20, the space between the first protection tube 20 and the third protection tube 24, and the space between the second protection tube 22 and the third protection tube 24 are filled with the inert gas. As described above, when the interior of the first protection tube 20 is filled with the inert gas, the interior of the insulating tube 12, i.e., the atmosphere around the thermocouple wires 16, 18 is also the inert gas. Even in the case where the insulating tube open tip end 15a as the hollow member with the open end face or the insulating tube closed tip end 15b as the hollow member with the closed end face is disposed around the thermocouple temperature measuring junction 14, the atmosphere around the thermocouple temperature measuring junction 14 and the thermocouple wires 16, 18 is also the inert gas. For this reason, it is feasible to effectively prevent reaction between the thermocouple and first protection tube 20, reaction between the first protection tube 20 and third protection tube 24, and reaction between the second protection tube 22 and third protection tube 24.

In the present embodiment, since the first protection tube 20 contains any one of Mo, W, Ta, and Ir having the low reactivity with the thermocouple and third protection tube 24, the lifetime of the thermocouple can be improved.

Furthermore, since the second protection tube 22 contains any one of graphite, C/C composite, glassy carbon, SiC, and BN with the low reactivity with carbon in the atmosphere and the third protection tube 24, or, contains any one of $Al_2O_3$, vitreous carbon, pyrolytic carbon-coated graphite, vitreous carbon-coated graphite, and PBN, it can certainly protect the thermocouple, first protection tube 20, and third protection tube 24 from the external environment. Furthermore, since the third protection tube 24 contains any one of Mo, W, Ta, Nb, and Ir with the low reactivity with the first protection tube 20 and the second protection tube 22, or, contains any one of graphite, C/C composite, SiC, glassy carbon, vitreous carbon, pyrolytic carbon-coated graphite, vitreous carbon-coated graphite, BN, and PBN, it can certainly protect the thermocouple and first protection tube 20 from the external environment.

Or, since the first protection tube 20 contains any one of $Al_2O_3$, MgO, CaO, BeO, $ZrO_2$, and $HfO_2$ which are stable oxides having the low reactivity with the thermocouple and the third protection tube 24, the lifetime of the thermocouple can be improved. Since the second protection tube 22 contains any one of graphite, C/C composite, glassy carbon, SiC, and BN having the low reactivity with carbon in the atmosphere and the third protection tube 24, or, contains any one of $Al_2O_3$, vitreous carbon, pyrolytic carbon-coated graphite, vitreous carbon-coated graphite, BN, and PBN, it can certainly protect the thermocouple, first protection tube 20, and third protection tube 24 from the external environment. Furthermore, the third protection tube 24 contains any one of Mo, W, Ta, Nb, and Ir having the low reactivity with the first protection tube 20 and the second protection tube 22, or, contains any one of graphite, C/C composite, SIC, glassy carbon, vitreous carbon, pyrolytic carbon-coated graphite, vitreous carbon-coated graphite, BN, and PBN, it can certainly protect the thermocouple and first protection tube 20 from the external environment.

The present invention does not have to be limited only to the above embodiments, but can have a variety of modifications. For example, the above embodiments were described with focus on the two configurations, the configuration with the double protection tubes of the first protection tube 20 surrounding the thermocouple and the second protection tube 22 surrounding the first protection tube; and the configuration with the triple protection tubes of the first protection tube surrounding the thermocouple, the third protection tube 24 surrounding the first protection tube, and the second protection tube 22 surrounding the third protection tube 24, but the present invention does not have to be limited only to these but also includes configurations with four or more protection tubes within the scope of the invention. It is also possible to freely change the thicknesses, lengths, and compositions of the respective protection tubes. The reason why the thicknesses and lengths are changeable is that when the thicknesses of the protection tubes are smaller, heat becomes easier to transfer, improving the temperature response. On the other hand, when the thicknesses are larger and, particularly, when the materials of the adjacent protection tubes are different, progress of reaction can be delayed more. Concerning the lengths of the protection tubes, when the protection tubes of necessary lengths are disposed at necessary locations only, manufacture becomes easier and cost can be lowered. For example, in a case where the thermocouple is likely to suffer abnormality such as deterioration or contamination, at a specific part of a temperature measurement target furnace, the protection tubes can be located only in the range of influence thereof, whereby the influence can be suppressed and whereby manufacture becomes easier, so as to reduce cost.

EXAMPLES

Next, the embodiments of the present invention will be described in more detail by comparison between Examples indicative of the experiment results of temperature measurement by means of the thermocouples of the present invention and Comparative Examples indicative of the experiment results of temperature measurement by means of the conventional thermocouples to measure a carbon-existing atmosphere at high temperatures. C- or Si-existing atmospheres around 2000° C. are extremely harsh ambiences where most of metals become carbonized or lower their melting point to deteriorate. In the case of the thermocouple using platinum, when it is used in a harsh environment around its upper limit temperature, even in an air atmosphere, its lifetime can reduce to about 50 hours; therefore, a criterion for judgment of operable time was determined to be 50 hours. For measuring temperatures in such atmospheres, it is a matter of course that an appropriate thermocouple must be selected, and selection of the protection tubes as constituents is also important. We clearly showed the protection tubes and structures thereof enabling the temperature measurement even in such harsh atmospheres.

Example 1

In the present example, the thermometer used was one according to the first embodiment. A set of graphite (second protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The graphite (second protection tube) had the outside diameter of 10 mm and the thickness of 1.75 mm, the Ir (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The graphite (second protection tube) was arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and after a lapse of 63.7 hours, the measurement was discontinued because the thermocouple exhibited an abnormality of thermoelectromotive force. It was confirmed that this thermocouple could be used even over 50 hours which was the criterion for temperature-measurable time. This thermocouple was detached to check conditions of the members and roughness of surface was recognized in the range of about 20 mm from the tip of the Ir (first protection tube).

Example 2

In the present example, the thermometer used was one according to the first embodiment. A set of vitreous carbon (second protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The vitreous carbon (second protection tube) had the outside diameter of 10 mm and the thickness of 1.75 mm, the Ir (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The vitreous carbon (second protection tube) was arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, slight discoloration (light brown) was observed in the range of 20 mm from the tip of the Ir (first protection tube), but there was no other abnormality recognized.

Example 3

In the present example, the thermometer used was one according to the first embodiment. A set of pyrolytic carbon-coated graphite (second protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The pyrolytic carbon-coated graphite (second protection tube) had the outside diameter of 10 mm and the thickness of 1.75 mm, the Ir (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The pyrolytic carbon-coated graphite (second protection tube) was arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, slight discoloration (light brown) and roughness of surface were observed in the range of 20 mm from the tip of the Ir (first protection tube), but there was no other abnormality recognized.

Example 4

In the present example, the thermometer used was one according to the first embodiment. A set of vitreous carbon-coated graphite (second protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. is an Ar atmosphere. The vitreous carbon-coated graphite (second protection tube) had the outside diameter of 10 mm and the thickness of 135 min, the Ir (first protection tube) had the outside diameter of 4.8 mm and the thickness of 0.5 mm, the HfO2 (insulating tube) was a two-hole tube having the outside diameter of 3.2 mm and the inside diameter of 0.9 mm, and the Ir and Ir-40 wt % Rh (wires) each had the diameter of 0.5 mm. The vitreous carbon-coated graphite (second protection tube) was arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, slight discoloration (light brown) and roughness of surface were observed in the range of 20 mm from the tip of the Ir (first protection tube), but there was no other abnormality recognized.

Example 5

In the present example, the thermometer used was one according to the first embodiment. A set of BN (second protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The BN (second protection tube) had the outside diameter of 10 mm and the thickness of 1 mm, the Ir (first protection tube) had the outside diameter of 4.8 mm and the thickness of 0.5 mm, the $HfO_2$ (insulating tube) was a two-hole tube having the outside diameter of 32 mm and the inside diameter of 0.9 mm, and the Ir and Ir-40 wt % Rh (wires) each had the diameter of 0.5 mm. The BN (second protection tube) was arranged without isolation of inside and outside and thus the interior atmosphere thereof was identical with the in-furnace atmosphere. In addition, the interior of the Ir (first protection tube) was filled with Ar so as to be isolated from the outside, Under the above conditions, the temperature measurement was started and the temperature measurement was terminated after a lapse of 100 hours. During the measurement, there was no abnormality of thermoelectromotive force recognized. In observation of appearance after the measurement, there was no particular abnormality recognized, either.

Example 6

In the present example, the thermometer used was one according to the first embodiment. A set of Al2O3 (second protection tube)/Ir (first protection tube)/HfO2 (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1800° C. in an Ar atmosphere. The Al2O3 (second protection tube) had the outside diameter of 10 mm and the thickness of 2 mm, the Ir (first protection tube) had the outside diameter of 4.8 mm and the thickness of 0.5 mm, the HfO2 (insulating tube) was a two-hole tube having the outside diameter of 3.2 mm and the inside diameter of 0.9 mm, and the Ir and Ir=40 wt % Rh (wires) each had the diameter of 0.5 mm. The Al2O3 (second protection tube) was arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, slight discoloration (light brown) and roughness of surface were observed in the range of 20 mm from the tip of the Ir (first protection tube), but there was no other abnormality recognized.

Example 7

In the present example, the thermometer used was one according to the second embodiment. A set of graphite (second protection tube)/vitreous carbon (third protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The graphite (second protection tube) had the outside diameter of 30 mm and the thickness of 10 mm, the vitreous carbon (third protection tube) had the outside diameter of 8 mm and the thickness of 1 mm, the Ir (first protection tube) had the outside diameter of 4.8 mm and the thickness of (15 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The graphite (second protection tube) and vitreous carbon (third protection tube) were arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, there was no particular abnormality recognized, either.

Example 8

In the present example, the thermometer used was one according to the second embodiment. A set of graphite (second protection tube)/pyrolytic carbon-coated graphite (third protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The graphite (second protection tube) had the outside diameter of 30 mm and the thickness of 10 mm, the pyrolytic carbon-coated graphite (third protection tube) had the outside diameter of 8 mm and the thickness of 1 mm, the Ir (first protection tube) had the outside diameter of 4.8 mm and the thickness of 0.5 mm, the $HfO_2$ (insulating tube) was a two-hole tube having the outside diameter of 12 mm and the inside diameter of 0.09 mm, and the Ir and Ir-40 wt % Rh (wires) each had the diameter of 0.5 mm. The graphite (second protection tube) and pyrolytic carbon-coated graphite (third protection tube) were arranged without isolation of inside and outside and thus the interior atmosphere thereof was identical with the in-furnace atmosphere. In addition, the interior of the Ir (first protection tube) was filled with Ar so as to be isolated from the outside, Under the above conditions, the temperature measurement was started and the temperature measurement was terminated after a lapse of 100 hours. During the measurement, there was no abnormality of thermoelectromotive force recognized. In observation of appearance after the measurement, slight discoloration (light brown) was observed in the range of 20 mm from the tip of the Ir (first protection tube), but there was no other abnormality recognized.

Example 9

In the present example, the thermometer used was one according to the second embodiment. A set of graphite (second protection tube)/vitreous carbon-coated graphite (third protection tube)/Ir (first protection tube)/HfO2 (insulating tube)/Ir and Ir=40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The graphite (second protection tube) had the outside diameter of 30 mm and the thickness of 10 mm, the vitreous carbon-coated graphite (third protection tube) had the outside diameter of 8 mm and the thickness of 1 mm, the Ir (first protection tube) had the outside diameter of 4.8 mm and the thickness of 0.5 mm, the HfO2 (insulating tube) was a two-hole tube having the outside diameter of 3.2 mm and the inside diameter of 0.9 mm, and the Ir and Ir-40 wt % Rh (wires) each had the diameter of 0.5 mm. The graphite (second protection tube) and vitreous carbon-coated graphite (third protection tube) were arranged without isolation of inside and outside and thus the interior atmosphere thereof was identical with the in furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, slight discoloration (light brown) was observed in the range of 20 mm from the tip of the Ir (first protection tube), but there was no other abnormality recognized.

Example 10

In the present example, the thermometer used was one according to the second embodiment. A set of graphite (second protection tube)/BN (third protection tube)/Ir (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The graphite (second protection tube) had the outside diameter of 30 mm and the thickness of 10 mm, the BN (third protection tube) had the outside diameter of 8 mm and the thickness of 0.8 mm, the Ir (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The graphite (second protection tube) and pyrolytic carbon-coated graphite (third protection tube)

were arranged without isolation of inside and outside and thus the interior atmosphere thereof was identical with the in-furnace atmosphere. In addition, the interior of the Ir (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, there was no particular abnormality recognized, either.

Example 11

In the present example, the thermometer used was one according to the first embodiment. A set of vitreous carbon (second protection tube)/Mo (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The vitreous carbon (second protection tube) had the outside diameter of 10 mm and the thickness of 1.75 mm, the Mo (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The vitreous carbon (second protection tube) was arranged without isolation of inside and outside and thus the interior atmosphere thereof was identical with the in-furnace atmosphere. In addition, the interior of the Mo (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, adhesion of black foreign matter originating in the vitreous carbon (second protection tube) was observed in the range of 20 mm from the tip of the Mo (first protection tube), but there was no leakage of Mo (first protection tube) recognized.

Example 12

In the present example, the thermometer used was one according to the first embodiment. A set of BN (second protection tube)/Mo (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The BN (second protection tube) had the outside diameter of 10 mm and the thickness of 1 mm, the Ir (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The BN (second protection tube) was arranged without isolation of inside and outside and thus the interior atmosphere thereof was identical with the in-furnace atmosphere. In addition, the interior of the Mo (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, slight roughness of surface was observed in the range of 20 mm from the tip but there was no other abnormality recognized.

Example 13

In the present example, the thermometer used was one according to the first embodiment. A set of vitreous carbon (second protection tube)/Ta (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The vitreous carbon (second protection tube) had the outside diameter of 10 mm and the thickness of 1.75 mm, the Ta (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The vitreous carbon (second protection tube) was arranged without isolation of inside and outside and thus the interior atmosphere thereof was identical with the in-furnace atmosphere. In addition, the interior of the Ta (first protection tube) was filled with Ar so as to be isolated from the outside. Under the above conditions, the temperature measurement was started and the temperature measurement was terminated after a lapse of 100 hours.

During the measurement, there was no abnormality of thermoelectromotive force recognized. In observation of appearance after the measurement, there was no particular abnormality recognized, either.

Example 14

In the present example, the thermometer used was one according to the first embodiment. A set of BN (second protection tube)/Ta (first protection tube)/$HfO_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The BN (second protection tube) had the outside diameter of 10 mm and the thickness of 1 mm, the Ir (first protection tube) had the outside diameter of 4.8 mm and the thickness of 0.5 mm, the $HfO_2$ (insulating tube) was a two-hole tube having the outside diameter of 3.2 mm and the inside diameter of 0.9 mm, and the Ir and Ir-40 wt % Rh (wires) each had the diameter of 0.5 mm. The BN (second protection tube) was arranged without isolation of inside and outside and thus the interior atmosphere thereof was identical with the in-furnace atmosphere. In addition, the interior of the Ta (first protection tube) was filled with Ar so as to be isolated from the outside. Under the above conditions, the temperature measurement was started and the temperature measurement was terminated after a lapse of 100 hours. During the measurement, there was no abnormality of thermoelectromotive force recognized. In observation of appearance after the measurement, there was no particular abnormality recognized, either.

Comparative Example 1

In the present example, the thermometer used was one obtained by excluding the second protection tube from the thermometer according to the first embodiment. A set of Ir (first protection tube)/HfO$_2$ (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1900° C. in an Ar atmosphere. The Ir (first protection tube) had the outside diameter of 4.8 mm and the thickness of 0.5 mm, the HfO$_2$ (insulating tube) was a two-hole tube having the outside diameter of 3.2 mm and the inside diameter of 0.9 mm, and the Ir and Ir-40 wt % Rh (wires) each had the diameter of 0.5 mm. The interior of the Ir (first protection tube) was filled with Ar. Under the above conditions, the temperature measurement was started and after a lapse of 7.6 hours, the measurement was discontinued because the thermocouple exhibited an abnormality of thermoelectromotive force. Thereafter, the thermocouple was detached to check conditions of the members and roughness of surface was recognized in the range of about 20 mm from the tip of the Ir (first protection tube).

Comparative Example 2

In the present example, the thermometer used was one obtained by excluding the second protection tube from the thermometer according to the first embodiment. A set of Ir (first protection tube)/HfO2 (insulating tube)/Ir and Ir-40 wt % Rh (wires) thermocouple constituting the thermometer was immersed by 20 mm in an Si-based melt in a furnace comprised of a furnace material of graphite, and temperature measurement of this melt was carried out at 1800° C. in an Ar atmosphere. The Ir (first protection tube) had the outside diameter of 4.8 mm and the thickness of 0.5 mm, the HfO2 (insulating tube) was a two-hole tube having the outside diameter of 3.2 mm and the inside diameter of 0.9 mm, and the Ir and Ir=40 wt % Rh (wires) each had the diameter of 0.5 mm. The interior of the Ir (first protection tube) was filled with Ar. Under the above conditions, the temperature measurement was started and after a lapse of 8.1 hours, the measurement was discontinued because the thermocouple exhibited an abnormality of thermoelectromotive force. Thereafter, the thermocouple was detached to check conditions of the members and roughness of surface was recognized in the range of about 20 mm from the tip of the Ir (first protection tube).

REFERENCE SIGNS LIST 10a, 10b carbon atmosphere thermometers; 12 insulating tube; 13 insertion holes; 14 thermocouple temperature measuring junction; 15a insulating tube open tip end; 15b insulating tube closed tip end; 16, 18 thermocouple wires; 20 first protection tube; 22 second protection tube; 24 third protection tube; 31, 33, 35 sealants; 40 sealant.

The invention claimed is:
1. A thermometer comprising:
a thermocouple having a pair of wires, a temperature measuring junction between the wires, and an insulator covering the wires;
a first protection tube surrounding the wires, the temperature measuring junction, and the insulator of the thermocouple, while at least partially spaced apart from the wires, the temperature measuring junction, and the insulator of the thermocouple;
a second protection tube surrounding the first protection tube, while at least partially spaced apart from the first protection tube; and
a third protection tube located outside the first protection tube and inside the second protection tube and surrounding the first protection tube, while at least partially spaced apart from the first protection tube and the second protection tube by a gap provided between the first protection tube and the third protection tube, and a gap provided between the second protection tube and the third protection tube, respectively,
wherein the first protection tube contains any one of Mo, W, Ta, and Ir as a primary component, the second protection tube contains any one of graphite, C/C composite, glassy carbon, SiC, BN, Al$_2$O$_3$, vitreous carbon, pyrolytic carbon-coated graphite, vitreous carbon-coated graphite, and PBN as a primary component, and the third protection tube contains any one of Mo, W, Ta, Nb, Ir, graphite, C/C composite, SiC, glassy carbon, vitreous carbon, pyrolytic carbon-coated graphite, vitreous carbon-coated graphite, BN, and PBN as a primary component.

2. The thermometer according to claim 1, wherein the second protection tube contains any one of graphite, C/C composite, glassy carbon, SiC, and BN as a primary component, and the third protection tube contains any one of Mo, W, Ta, Nb, and Ir as a primary component.

3. The thermometer according to claim 1, wherein at least any one of an interior of the first protection tube, the gap between the first protection tube and the third protection tube, and the gap between the second protection tube and the third protection tube is filled with an inert gas.

4. A thermometer comprising:
a thermocouple having a pair of wires, a temperature measuring junction between the wires, and an insulator covering the wires;
a first protection tube surrounding the wires, the temperature measuring junction, and the insulator of the thermocouple, while at least partially spaced apart from the wires, the temperature measuring junction, and the insulator of the thermocouple;
a second protection tube surrounding the first protection tube, while at least partially spaced apart from the first protection tube; and
a third protection tube located outside the first protection tube and inside the second protection tube and surrounding the first protection tube, while at least partially spaced apart from the first protection tube and the second protection tube by a gap provided between the first protection tube and the third protection tube, and a gap provided between the second protection tube and the third protection tube, respectively,
wherein the first protection tube contains any one of Al$_2$O$_3$, MgO, CaO, BeO, ZrO$_2$, and HfO$_2$ as a primary component, the second protection tube contains any one of graphite, C/C composite, glassy carbon, SiC, BN, Al$_2$O$_3$, vitreous carbon, pyrolytic carbon-coated graphite, vitreous carbon-coated graphite, and PBN as a primary component, and the third protection tube contains any one of Mo, W, Ta, Nb, Ir, graphite, C/C composite, SiC, glassy carbon, vitreous carbon, pyrolytic carbon-coated graphite, vitreous carbon-coated graphite, BN, and PBN as a primary component.

5. The thermometer according to claim 4, wherein the second protection tube contains any one of graphite, C/C composite, glassy carbon, SiC, and BN as a primary component, and the third protection tube contains any one of Mo, W, Ta, Nb, and Ir as a primary component.

6. The thermometer according to claim 4, wherein at least any one of an interior of the first protection tube, the gap between the first protection tube and the third protection tube, and the gap between the second protection tube and the third protection tube is filled with an inert gas.

* * * * *